Dec. 22, 1964  R. P. HAVILAND  3,162,764
SPACE VEHICLE ATTITUDE CONTROL
Filed Jan. 3, 1961  5 Sheets-Sheet 1

*INVENTOR.*
ROBERT PAUL HAVILAND
BY
Edward W. Hughes
ATTORNEY

Dec. 22, 1964  R. P. HAVILAND  3,162,764
SPACE VEHICLE ATTITUDE CONTROL
Filed Jan. 3, 1961  5 Sheets-Sheet 2

INVENTOR.
ROBERT PAUL HAVILAND
BY Edward W. Hughes
ATTORNEY

Dec. 22, 1964  R. P. HAVILAND  3,162,764
SPACE VEHICLE ATTITUDE CONTROL
Filed Jan. 3, 1961  5 Sheets-Sheet 4

INVENTOR.
ROBERT PAUL HAVILAND
BY
Edward W. Hughes
ATTORNEY

Dec. 22, 1964   R. P. HAVILAND   3,162,764
SPACE VEHICLE ATTITUDE CONTROL
Filed Jan. 3, 1961   5 Sheets-Sheet 5

INVENTOR.
ROBERT PAUL HAVILAND
BY Edward W Hughes
ATTORNEY

United States Patent Office 3,162,764
Patented Dec. 22, 1964

1

3,162,764
SPACE VEHICLE ATTITUDE CONTROL
Robert P. Haviland, Radnor, Pa., assignor to General
Electric Company, a corporation of New York
Filed Jan. 3, 1961, Ser. No. 80,154
7 Claims. (Cl. 250—83.3)

This invention relates to space vehicles, and more particularly to means for stabilizing the attitude of a space vehicle with respect to a predetermined celestial body.

The term space vehicle as used herein is defined as being an apparatus or device designed normally to orbit or operate, for at least a limited period of time, at altitudes sufficiently far above the surface of the earth or other celestial body so that the effect of atmosphere is negligible or can be considered to be nonexistent. The definition thus is broad enough to include any vehicle that is free to move outside the atmosphere of the earth.

Only within recent times have space vehicles been placed in orbit about a focal parent body, such as the earth. It is clear that there are missions that have not been previously done that can or soon will be accomplished from a space vehicle or with a space vehicle orbiting the earth. It is also clear that some missions that have been previously done will be done significantly better by space vehicles. One of the new missions that is being accomplished for the first time through the use of space vehicles is to observe, among other things, weather phenomena over most of the earth within a comparatively short time period. Also, space vehicles when used as communication relay points will make it possible to provide reliable communications between any two points of the globe by extremely high frequency radio links.

In order for a space vehicle to better perform this type of mission and other type missions or functions than those listed above, it is highly desirable, if not absolutely necessary, to stabilize the attitude, or angular position, of such vehicles with respect to a reference celestial body such as the earth. This may also be desirable for a space vehicle orbiting some other celestial body such as the moon or another planet. Such stabilization may consist simply in maintaining a particular axis of the vehicle normal to the geometric center of the focal body or so that the particular axis, the yaw axis, points toward the center of gravity of the focal body, if rotation of the vehicle is not objectionable. In the terminology conventional in navigation, such an axis is denoted as the yaw axis, and the two axes orthogonal to it are called the roll axis (in the direction of motion) and the pitch axis (at right angles to the yaw and roll axes, transverse to the direction of motion). It is evident that preventing the vehicle from rotating about the roll and pitch axes will maintain the yaw axis stable. In any event, if stabilization of such an axis is achieved, stabilization against rotation may be achieved by other means, since the problem of detecting rotation is somewhat less baffling in that rotation may be detected by means completely within the vehicle making use of phenomena such as the Coriolis acceleration. The detection of angular orientation with respect to another body is dependent upon some means of determining the relative position of the vehicle with respect to that body. When a vehicle is in orbit around a focal body, like the moon around the earth, stabilization with respect to the focal body, rather than with respect to the universe, will cause the vehicle always to turn the same part of itself toward the body, which would not occur if the vehicle were stabilized with respect to the universe.

Certain advantages are derived if the attitude of a space vehicle is stabilized with respect to a reference body. This is particularly true when it is desired to communicate between the space vehicle and a point or points on the surface of the reference body. Where the space vehicle is stabilized in this manner, it will be easier to use directional antennae for both receiving and transmitting radiant energy signals, which procedure will reduce the weight of the transmitter, receiver and their power supply. Similarly, when a space vehicle is used for reconnaissance purposes, it is more efficient to stabilize the vehicle so that photographic cameras, television cameras, or any other intelligence gathering devices which are carried by the vehicle will be pointed toward the reference body in a desired manner. In such a stabilized vehicle, it will thus not be necessary to provide special apparatus for the intelligence gathering devices to make certain that they point toward the reference body.

In the attitude stabilization devices and systems heretofore proposed for use in space vehicles and in devices used for similar purposes in present day aircraft which are designed to operate within the earth's atmosphere, numerous moving parts have been used. When such devices are subjected particularly to the extremely low ambient pressures encountered in space, the bearing surfaces of the moving parts tend to seize or adhere to each other to render the devices inoperative.

It is accordingly an object of this invention to provide apparatus for stabilizing the attitude of a space vehicle about two of its axes, its pitch and roll axis, for example, with respect to reference celestial body.

It is another object of this invention to provide a system having a minimum of moving parts for maintaining a space vehicle at a predetermined attitude with reference to a celestial body.

It is a further object of this invention to provide an arrangement for maintaining a space vehicle at a predetermined attitude with respect to a reference body, which arrangement is simple, lightweight and of rugged construction.

A primary feature of this invention in providing an attitude indicating or stabilizing system for space vehicles is the provision of an arrangement using the average intensity of radiation from a portion of a reference celestial body, including its atmosphere, if any, and the radiation from outer space adjacent this reference body to provide reference information. More particularly, and in accordance with one embodiment of the invention, a space vehicle is provided with at least three heat sensory elements, with each of these heat sensory elements being so positioned on the space vehicle as to sense incident heat from a separate distinct discrete portion of the space surrounding the vehicle. These heat sensory elements are so positioned on the space vehicle that when the vehicle is operating near a reference celestial body, each of these heat sensory elements will survey and sense heat from a portion of the reference body and also a portion of the free space adjacent to the reference body. Thus, the average temperature of the portion of space being surveyed by each of the heat sensory elements will be dependent upon the fraction of the portion being sensed which is occupied by the reference celestial body. This is because of the relatively large temperature differential between the reference body and the free space adjacent thereto. If, for example, the reference body should be earth, the average temperature of the reference body would be about 300° K., while the average temperature of the adjacent free space would be about 4° K. In one embodiment of the invention, the heat sensory elements may be positioned on the space vehicle so that when the vehicle is in its predetermined attitude with respect to the earth, the heat sensory elements would be sensing heat from proportionately equal areas of the earth and space and the average temperature sensed by each would be the same. Thus, the response of the heat sensory elements would be the same. If, however, in this embodiment, the attitude of the space vehicle should depart from its predetermined orientation, then one of the heat sensory elements will survey a greater portion of the earth than will another while another will be surveying a greater portion of the free space adjacent to the earth; and the response of one of the elements would be greater than that of the other. Means responsive to any relative change in average temperature of the areas being sensed by the heat sensory elements will then adjust the attitude of the space vehicle with respect to the earth until the predetermined attitude is again obtained.

Of course, the heat sensory elements need not be positioned on the space vehicle in such a manner that they sense average temperatures from proportionately equal areas of the earth and space when the vehicle is in its predetermined attitude, but may be positioned so that the average temperatures sensed by the heat sensory elements will be in any predetermined proportionate relation.

For a better understanding of the invention, reference may be had to the drawings, in which.

Figure 10:
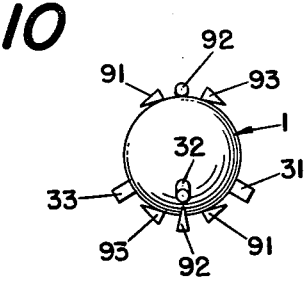
Figure 10:
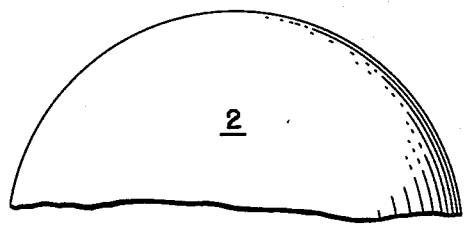
Figure 11:
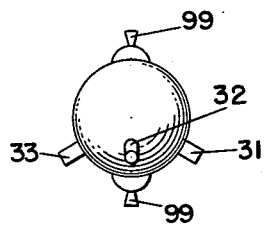
Figure 11:
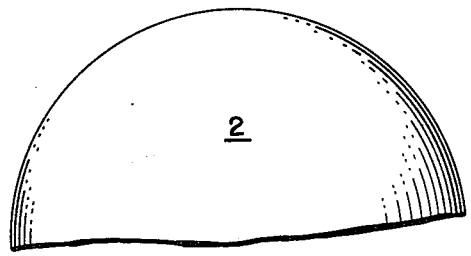
Figure 12:
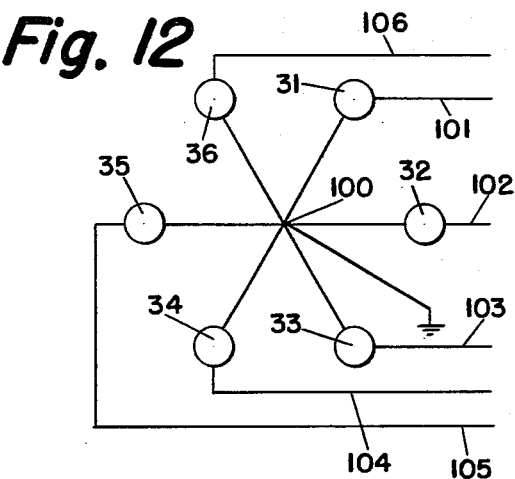
Figure 13:
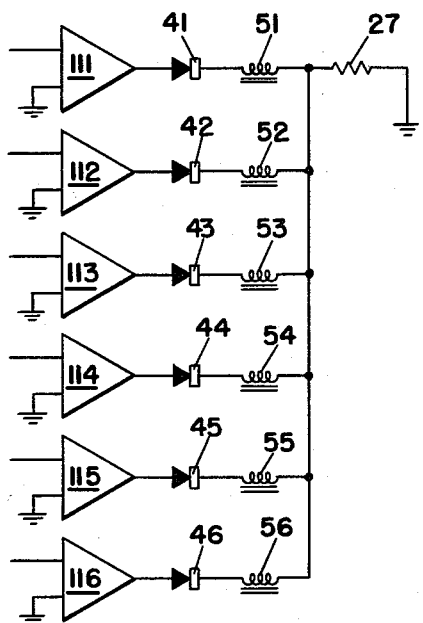
Figure 14:
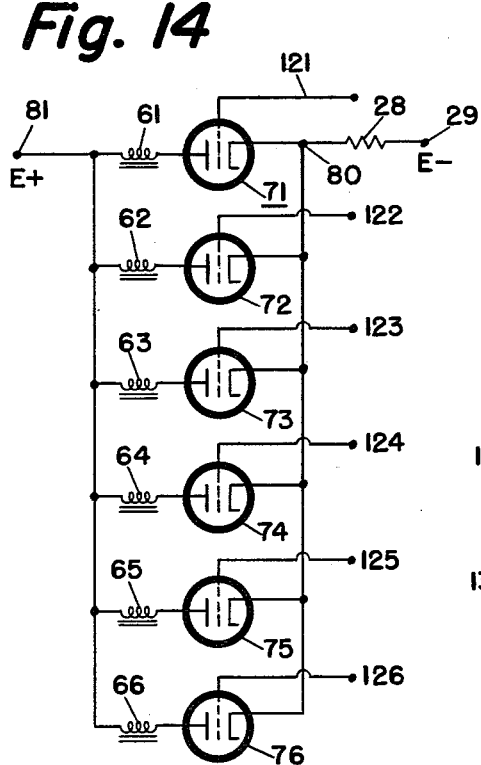
Figure 15:
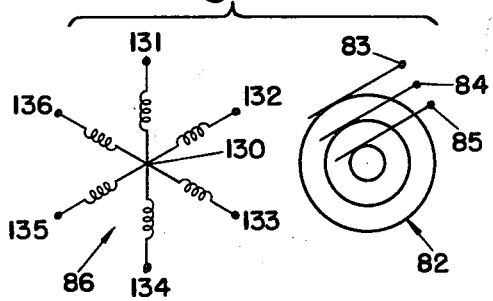
Figure 16:
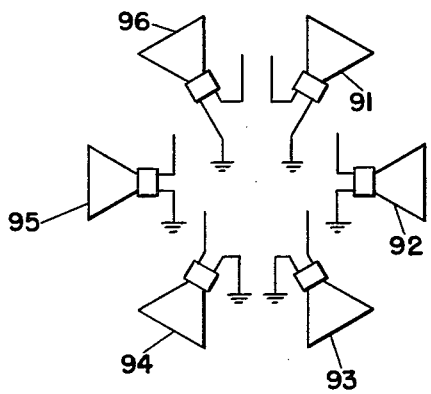
Figure 17:
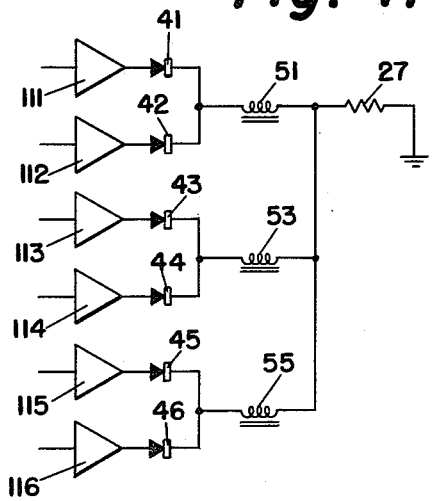
Figure 18:
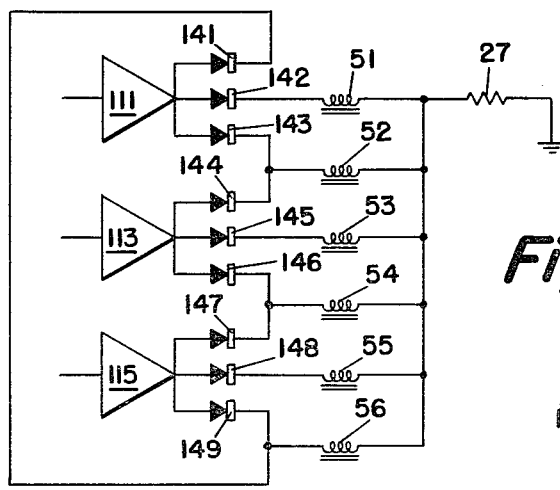

FIG. 10 represents a satellite in orbit around a celestial body, the satellite being provided with a multiplicity of sensing elements, and with reaction jets for applying stabilzing torques to the satellite, FIG. 11 repesents a satellite in orbit around a celestial body, the satellite being provided with a multiplicity of sensing elements and a single pair of orientable jets for applying stabilizing torques to satellite, FIG. 12 represents schematically a mode of connecting a plurality of sensors, and FIGS. 13 and 14 represents two modes of amplifier connection adapted to receive and utilize signals from sensors thus connected, FIG. 15 represents schematically a selsyn with windings arranged suitably for operative connection to the output of amplifiers connected as in FIG. 13 or 14, FIG. 16 represents a scheme for arranging pairs of reaction jets in a manner suitable for control by the outputs of amplifiers arranged according to FIG. 13 or 14, FIG. 17 represents a scheme for connecting a plurality of sensors to control a smaller number of torque devices, and FIG. 18 represents a mode of amplifier connection whereby a plurality of torque-producing devices may be controlled by the signals from a smaller number of sensors.

Figure 1:
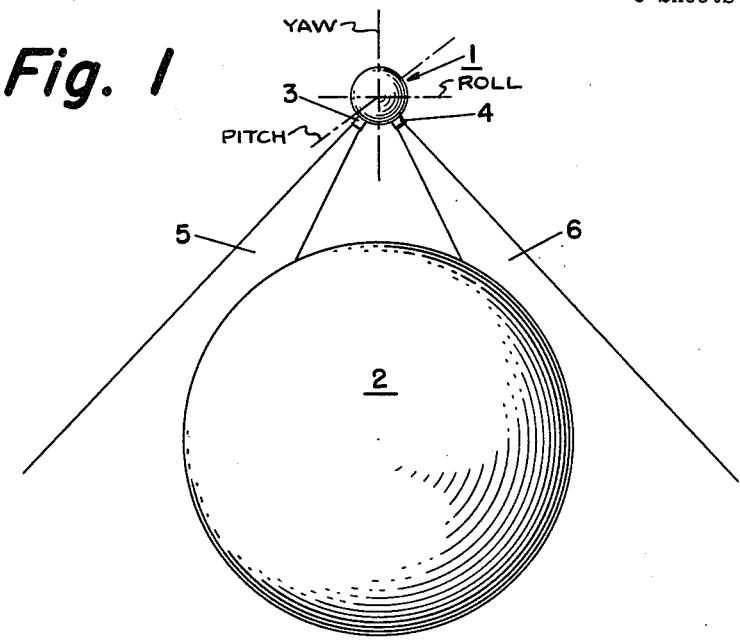
FIG. 1 is a schematic representation of a space vehicle in the vicinity of a reference celestial body.

In FIG. 1 is schematically shown a space vehicle, or satellite, 1 in the vicinity of a reference celestial body 2. If the space vehicle 1 is a satellite, then the reference celestial body 2 would be its parent body. In this manner, "parent body" means the body being orbited, not necessarily the celestial body from which the space vehicle 1 originated. The scale of the space vehicle 1 is greatly exaggerated for clarity. The reference celestial body 2 may be earth, or may be any other celestial body. The space vehicle 1 includes heat sensory elements such as 3 and 4. The heat, or radiant energy, sensory elements 3 and 4 are mounted in spaced relation on the space vehicle 1 and are positioned so that each of the heat sensory elements 3 and 4 sense heat from a different discrete portion of space. In the arrangement shown in FIG. 1 heat sensory element 3 senses heat from a discrete portion of space 5 and heat sensory element 4 senses heat from a discrete portion of space 6. When the space vehicle 1 is in its predetermined attitude with respect to the celestial body 2, each of the discrete portions of space 5 and 6 includes a predetermined proportionate portion of the reference celestial body 2 and also a proportionate portion of the free space, or sky, adjacent thereto.

Figure 2A:
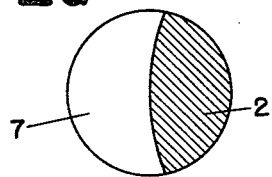
FIGS. 2a and 2b are schematic representations of the incident heat sensed by two diametrically opposed heat sensory elements on a space vehicle when, according to one embodiment of the invention, the space vehicle is in its predetermined attitude with respect to a reference body.
Figure 2B:
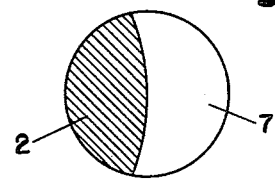
Figure 3A:
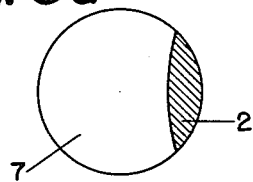
FIG. 3a and 3b are schematic representations of the incident heat sensed by two heat sensory elements on a space vehicle when, according to one embodiment of the invention, the space vehicle is not in its predetermined attitude with respect to a reference body.
Figure 3B:
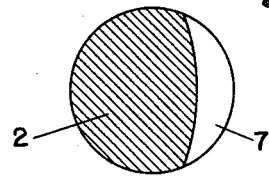

In one embodiment of the invention, as schematically shown in FIGS. 2a and 2b, when the space vehicle 1 is in its predetermined attitude with respect to the celestial body 2, each of the heat sensory elements 3 and 4 are so positioned on the vehicle 1 as to sense heat from an equal amount of the celestial body 2 and an equal amount of the free space 7 adjacent thereto. However, as is shown in FIGS. 3a and 3b, should space vehicle 1 for some reason change its attitude relative to the celestial body 2 so that the space vehicle 1 is no longer in its predetermined attitude, then one of the heat sensory elements will sense a greater proportionate portion of the celestial body 2 and a lesser proportionate portion of the free space 7 adjacent thereto than will the other heat sensory element.

If, for example, the reference celestial body 2 should be the earth, then the average temperature of the body and its atmosphere will be about 300° K., while the average temperature of the free space outside the atmosphere of the reference body will be about 4° K. Thus, it is seen that the average temperature of the portion of space being sensed by one of the heat sensory elements 3 or 4 is directly dependent upon the proportion of the space which is occupied by the reference body 2. It thus follows that, in the embodiment shown, when the space vehicle 1 is in its predetermined attitude with respect to the reference body 2, and each of the heat sensory elements 3 and 4 senses an equal proportionate portion of the reference body 2, the average temperature of the portion of space being sensed by the heat sensory elements 3 and 4 will be equal; while if the space vehicle 1 departs from its predetermined attitude, one of the heat sensory elements 3 or 4 will sense a greater portion of the reference body 2 than will the other and the average temperature of the portion of space being sensed by the two elements 3 and 4 will be different.

Of course, the invention is not limited to arrangements in which the heat sensory elements 3 and 4 are positioned on the space vehicle 1 in such a manner that, when the space vehicle 1 is in its predetermined attitude with respect to the reference body 2, each of the heat sensory elements 3 and 4 sense an equal proportionate portion of the reference body 2. The heat sensory elements 3 and 4 may be so positioned that the average temperatures of the portions of space being sensed by the heat sensory elements 3 and 4 will be in any desired predetermined relation when the space vehicle 1 is in its desired predetermined attitude with respect to the celestial reference body 2.

It is evident that equality (or other predeterminedly significant relation) of the signals received by sensors 3 and 4 is not, in fact, sufficient indication that the vehicle 1 is in the desired attitude with respect to parent or focal body 2, but only that it is in the desired angle with respect to roll axis normal to the observer and the plane of the paper of FIGURE 1. Vehicle 1 might turn about its roll axis parallel to the plane of the paper without disturbing the equality or other desired relation of the signals received by sensors 3 and 4. However, the initial description has been made with respect to only the two sensors because the underlying principle is most simply understood on such a basis, and also because some stabilizing devices serve to control attitude only with respect to one axis. Thus, for controlling such a stabilizing device, one pair of sensors such as 3 and 4 located on a line parallel to the roll axis may conveniently be used, as hereinafter described, to prevent rotation about the pitch axis; and a similar pair of sensors may be located on a line parallel to the pitch axis and used to control a device to prevent rotation about the roll axis.. The combined effect of such stabilization is to cause the yaw axis to point to the geometric center of the parent, or focal, body.

Figure 4:
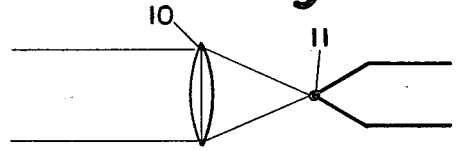
FIG. 4 is a schematic representation of a heat sensory element which may be used in the invention.

FIGURE 4 shows a schematic representation of a simple heat sensory element which may be used in the invention. The lens 10 may be any suitable lens for focusing incident radiation upon a transducer, such as the sensitive element 11, which may be a thermocouple composed of two dissimilar metals or may be any other radiation sensitive element; for example, a thermistor.

Figure 5:
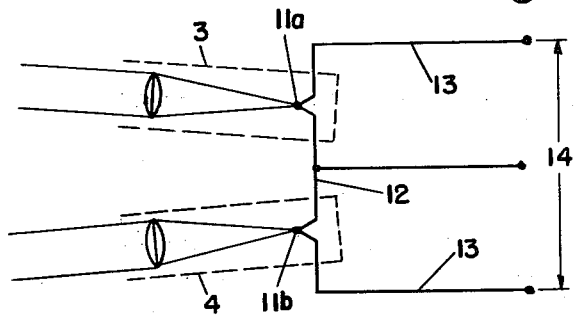
FIGS. 5, 6 and 7 show circuit arrangements which may be used with the subject invention.

FIGURE 5 shows a circuit arrangement using heat sensory elements such as are shown in FIGURE 4 to obtain an electrical signal which is proportional to the difference in the average temperature of the portion of space being sensed by the heat sensory elements 3 and 4. The thermocouples 11a and 11b shown therein are connected in series opposition so that any output signal occurring across the output terminals 14 will be representative of the differences in the voltages developed at the thermocouples when incident heat is focused upon the thermocouples 11a and 11b. In the circuit shown in FIGURE 5, the common wire 12 of the two thermocouples 11a and 11b may be, for example, iron, while the wires 13 which, together with the iron wire 12 form the two thermocouples 11 of dissimilar metals, may be copper. It will be apparent that both the polarity and amplitude of the voltage, or error signal, appearing across terminals 14 will be indicative of the attitude of the space vehicle.

Figure 6:
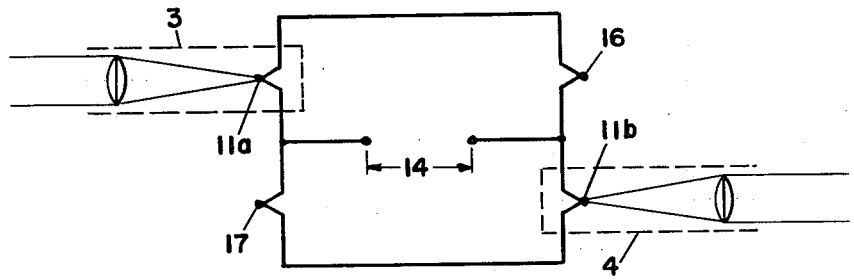

FIG. 6 shows heat sensory elements 3 and 4 similar to those shown in FIGS. 4 and 5 connected in a bridge circuit arrangement to obtain an output signal which is dependent upon the difference in the average temperature of the portion of space being sensed by the heat sensory elements 3 and 4. The thermocouples 16 and 17 are dummy elements which are maintained at a reference temperature and again, the polarity and amplitude of the signal appearing across the output terminals 14 an error signal, will be a measure of the differences in voltages appearing at the thermocouples 11 and an indication of the attitude of the vehicle.

Figure 7:
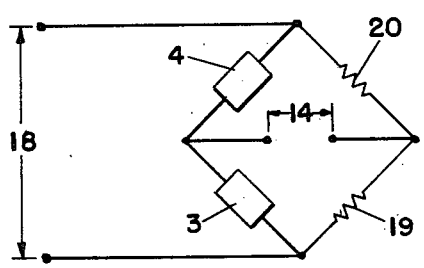

FIGURE 7 shows a bridge circuit which may be used in the subject invention when the heat responsive element 11 is a thermistor rather than thermocouple. The heat responsive elements 3 and 4 are connected in a bridge circuit arrangement with resistors 19 and 20. The terminals 18 may be energized by any suitable D.C. source and again, the polarity and amplitude of any output signal appearing across the terminals 14 will represent a difference in the average temperature of the portion of space being sensed by the heat responsive elements 3 and 4 and an indication of the attitude of the vehicle.

Figure 8:
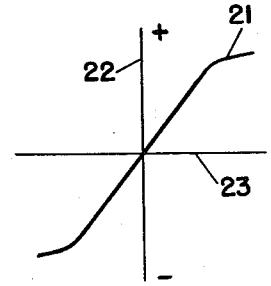
FIG. 8 shows schematically the response of the circuits shown in FIGS. 5, 6 and 7 with varying attitudes of the space vehicle with respect to its reference celestial body

FIG. 8 shows a graphical representation of the response of the circuits shown in FIGS. 5, 6 and 7 as a function of the difference in the average temperatures of the areas of space sensed by the heat sensory elements 3 and 4. The ordinate 22 of the graph represents the output signal appearing at the terminals 14 and the abscissa 23 represents the difference in the average temperature being sensed by the heat sensory elements 3 and 4. The curve 21 shows the output signal as a function of the difference of the average temperatures as sensed by the heat sensory elements 3 and 4.

Figure 9:
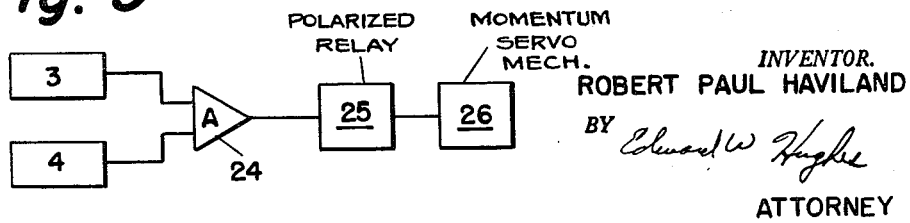
FIG. 9 shows, in block diagram, a system for adjusting the attitude of the space vehicle with respect to its reference celestial body.

FIG. 9 shows, in block diagram form, a system for adjusting and stabilizing the attitude of the space vehicle.

The electrical signals from the heat sensory elements 3 and 4 are combined in any suitable manner and are amplified by the amplifier 24. The output, if any, from the amplifier 24 operates the polarized relay 25, which in turn controls the momentum servo mechanism 26, for adjusting the attitude of the vehicle back to the desired attitude which mechanism may be of the type disclosed in my U.S. Patent No. 2,856,142.

The signals from the heat sensory elements 3 and 4 may be subtracted before being applied to the input of the amplifier 24, or the amplifier 24 itself may be a difference amplifier, a ratio amplifier, or any other suitable means for obtaining a signal indicative of the relation of the average temperatures of the portions of space being sensed by the heat sensory elements 3 and 4.

In the circuits and system shown in FIGS. 5 through 9, it is assumed that the heat sensory elements 3 and 4 are so positioned on the space vehicle 1 that, when the space vehicle 1 is in its predetermined attitude with respect to the reference body 2, the average temperature sensed by the heat sensory elements 3 and 4 is equal. If it is desired instead that, when the space vehicle 1 is in its predetermined attitude with respect to the reference body 2, the relation of the average temperatures sensed by the heat sensory elements 3 and 4 be something other than equal, any suitable biasing means may be provided with the shown circuits to provide an output signal which is indicative of a change in the relation of the average temperatures sensed from their predetermined relation.

Not all devices for applying stabilizing torques to a vehicle in space are confined to operation with respect to a single axis or a single pair of axes. If, for example, pairs of jets of some kind are provided to apply controllable torque reactions to the vehicle, these may be located symmetrically about the vehicle. Three such jet pairs located at 120 degree intervals with respect to the yaw axis as a center, will, when individually operated, produce rotations respectively around three axes located at angles of 120 degrees with respect to each other. Alternatively, a single pair of thrust jets of some kind may be adapted to controllable deflection in any selected direction. It is evident that such means as these are not particularly well adapted to be controlled by pairs of sensors orthogonally located. Since three direction cosines suffice to determine the orientation of a line, it is evident that the signals from three non-coincidentally oriented sensors should be capable of determining the orientation of the yaw axis of a space vehicle, and that less than three will not suffice. On the other hand, for the purpose of achieving some degree of compensation for failure or inaccuracy of a defective sensor, and alternatively or additionally for the purpose of compensation for stochastic variations in the signals received by individual sensors, it may be desirable to provide a number of sensors considerably larger than three or four, and to provide means for receiving the signals from all of these and deriving from such sensor signals control signals appropriate to control the operation of torque devices not necessarily equal in number to the number of sensors.

In FIG. 10 there is represented a vehicle 1, a focal or parent body 2 around which vehicle 1 is in orbit, sensors 31, 32, and 33 visible with indication of their respective orientations, and associated with the represented sensors 31, 32, and 33, controllable pairs of reaction jets 91, 92, and 93, respectively, which are fixed in angular position with respect to 1. FIG. 11 is somewhat similar to FIG. 10, but differs in having represented a single pair of reaction jets 99 controllable in direction with respect to the vehicle 1. For purposes of illustration, various embodiments having, for the most part, six sensors and six (or one) torque-producing devices have been represented. It is intended to indicate by FIGS. 10 and 11 that only three of the six sensors are visible in the representation because vehicle 1 conceals the others. For simplicity, only the jets associated with the represented sensors are shown.

FIG. 12 represents six sensors 31 through 36, inclusive, with a common polarity of terminal of each connected to a grounded point 100. The other terminal of each sensor is brought out in conductors designated, respectively, 101 through 106, inclusive. It is assumed, for simplicity, that sensors 31 through 36 are symmetrically located and oriented around the desired yaw axis of vehicle 1, and that the sensitivity and other characteristics of these sensors are substantially equal.

FIG. 13 represents a circuit scheme for utilizing the outputs of sensors 31 through 36 to control torque-producing or reaction devices. Amplifiers designated 111 through 116 are represented as having undesignated inputs; the input of 111 is to be supposed connected to conductor 101 of FIG. 12, the input of 112 to conductor 102, and so on through the connection of the input of amplifier 116 to conductor 106 of FIG. 12. The amplifiers are represented simply by the conventional symbol for an amplifier, and they are assumed to be all alike in characteristics, and to have (in the particular polarity chosen for explanations) positive outputs. The outputs of amplifiers 111 through 116, inclusive are represented as connected through diodes (numbered respectively 41 through 46) to ferro-magnetically cored inductive windings 51, 52, 53, 54, 55, and 56; and the opposite ends of windings 51 through 56 are represented as connected together and thence through a single resistor 27 to ground. If inputs from the various sensors 31 through 36 are different, they will produce different outputs from amplifiers 111 through 116, respectively. Let it be assumed that the output of amplifier 111 is greater than the output of any other of the similar amplifiers. Then it will pass through diode 41 and winding 51 to resistor 27, and thence to ground. If the output of amplifier 111 exceeds the outputs of all the similar amplifiers sufficiently, the junction of winding 51 and resistor 27 will be higher in potential than the outputs of amplifiers 112 through 116, and current will flow only through winding 51. If, on the other hand amplifiers 111 and 112 have approximately equal outputs, greater than those of amplifiers 113 through 116, current will flow through windings 51 and 52 equally. It is thus evident that the winding associated with an amplifier having an input (and consequent output) markedly greater than that of any similar amplifier will be excited alone; but when the difference between the inputs to two (or more) amplifiers is slight, the windings associated with the outputs of such amplifiers will be excited more or less proportionately to the inputs to the amplifiers. In other words, the system of N (in this case, six) discrete sensors and amplifiers is capable of some degree of interpolation between the discretely determined locations of the amplifiers. Windings 51 through 56 may be considered as representing (FIG. 15) windings on a common stator 86 of a selsyn, the windings 51 through 56 being identical with windings 131 through 136, respectively. The rotor 82 is represented as having three slip-connected terminals 83, 84, and 85. The signals obtained from terminals 83, 84, and 85 when rotor 82 is rotated with respect to stator 86 may be applied to standard servo system input to control the angle of torque means 99 to correct the aspect of the missile. Alternatively, the windings 51 through 56, inclusive, of FIG. 13 may be regarded as control solenoids on individual pairs of reaction jets 91 through 96, respectively, of FIG. 16. If it is desired to employ only three (presumably equally spaced) pairs of jets to be controlled by the outputs of all six amplifiers 111 through 116, respectively, the outputs of two adjacent amplifiers may be buffed by diodes 41 through 46, respectively, as represented in FIG. 17, through only three output windings 51, 53, and 55.

FIG. 14 represents an amplifier circuit, schematically, which is adapted for use in the embodiment of my invention. Triodes 71 through 76 are represented as connected with a common cathode resistor 28, and output windings 61 through 66, completely analogous to windings 51 through 56. This amplifier may be designed to have any one of a variety of characteristics. If it is designed to operate with all its stages in their linear range, the potential of the common cathode junction 80 will be a measure of the average of all the input signals. This has the possibly interesting property that it will reach a maximum (or a minimum, depending upon polarity of connections from the sensors) if the vehicle should lose altitude to such an extent that all of its sensors viewed nothing but the surface of the parent body, and would reach a minimum (or a maximum) if the vehicle should gain altitude to such an extent that all of its sensors viewed nothing but free space. For the most important present purpose, the fact that the cathodes are all at the same potential assures that those of triodes 71 through 76 which have the more positive signals applied to their grids will conduct more heavily, and those which have less positive signals applied to their grids will conduct less heavily. If the amplitude range of the incoming signals applied to grid connections 121 through 126 is so great as to drive the tubes into non-linear operation (which may be reached more readily by making resistor 28 of rather large value), then conduction may be limited to the one or two of tubes 71 through 76 which have the most positive input signal. FIG. 14 has been represented as an amplifier circuit employing triodes; polygrid tubes may, of course, be employed but have not been shown because of the increased complexity of the diagram when additional grids, potential sources, and bypassing are included. For amplifier design art (which is very voluminous) "Vacuum Tube Amplifiers," edited by Valley and Wallman, volume 18 of the Radiation Laboratory Series, published in 1947 by McGraw-Hill Book Company, of 330 West 42nd Street, New York, N.Y., U.S.A., is a standard reference. It will be recognized that the circuitry schematically represented in FIG. 14 can achieve substantially the same results as the scheme represented in FIG. 13.

FIG. 18 is, in a sense, the inverse of FIG. 17. FIG. 17 represents how a greater number of sensors and amplifiers may be used to control smaller number of windings. FIG. 18 represents how a smaller number of sensors and amplifiers may be applied to control a larger number of windings. Thus, for example, if signals equally strong are fed to amplifiers 111 and 113 from their respective sensors, winding 52 will receive a greater input than either winding 51 or 53, since it is being fed at the same potenital that they are, but through two diodes 143 and 144 in parallel so that the diode drop will be lower in the feed circuit to winding 52, and a higher potential will appear across winding 52 itself. If necessary, to achieve sufficient discrimination, resistors may be deliberately placed in series with the diodes. It will be observed that, if windings 51, 53, and 55 are omitted from FIG. 18, the number of amplifiers and windings will be equal, but each winding will be fed by two amplifiers, and each amplifier will feed two windings—an arrangement which might have value in improving reliability.

While the invention is thus disclosed and described, it is obviously not limited to the embodiments shown, but numerous other embodiments will be seen by those skilled in the art. For example, the invention is not limited to the particular heat sensory elements shown or to the particular difference circuit arrangements shown and described. Also, suitable biasing means could be provided with one or both of the heat sensory elements to effect desired changes in the attitude of the space vehicle with respect to the reference celestial body. It is clear that these and other variations in details of application are comprehended in the basic teachings of my invention, which is defined by the following claims.

What is claimed as new and desired to be secured by Letters Patent of the United States is:

1. A system for maintaining the attitude of a space vehicle in a predetermined relationship with respect to a parent body, said system comprising a plurality of radiant energy sensory elements, each of said elements having transducer means for producing an electrical signal which is a function of the amount of heat energy focused upon it and focusing means fixedly mounted on said space vehicle for continually focusing all the radiation transmitted through the focusing means from within a fixed field of view onto said transducer means, each of said sensory means being fixedly mounted on the vehicle so that when the attitude of said vehicle has said predetermined relationship with respect to its parent body each sensory element will view substantially different portions of the parent body and the sky, torque means, and circuit means to which the electrical signals of each element are applied, said circuit means controlling said torque means so that said torque means produces torques of the proper directions and magnitudes to substantially maintain the attitude of the vehicle in said predetermined relationship.

2. A system for maintaining the attitude of a space vehicle in a predetermined relationship with respect to a parent body about which the satellite is adapted to orbit, said system comprising a plurality of radiant energy sensory elements, each of said elements having transducer means for producing an electrical signal proportional to the amount of heat energy focused upon it, and focusing means fixedly mounted on said space vehicle for continually focusing all radiation transmitted through the focusing means from within a fixed field of view onto said transducer means, each of said sensory means being fixedly mounted on the satellite in a predetermined manner so that when the attitude of said satellite has said predetermined relationship with respect to its parent body a substantially different portion of the parent body and sky will be within the field of view of each sensory element, circuit means to which the electrical signals of each element are applied for producing error signals which are a function of the deviation of the attitude of the satellite from said predetermined relationship, and torque means, to which the error signals are applied, for producing torques responsive to said error signals of the proper direction and magnitude to substantially maintain the attitude of the satellite in said predetermined relationship.

3. In an attitude control system for a satellite adapted to orbit a parent body, a plurality of heat sensory means, each of said sensory means being comprised of transducer means for producing an electrical signal which is a function of the radiant energy incident upon it, and focusing means fixedly mounted on said satellite for continuously focusing all the incident thermal radiation within a given field of view passing through the focusing means upon the transducer means, each of said heat sensory means adapted to be fixedly mounted on the satellite in a predetermined relationship with respect to the satellite so that when the satellite has the desired attitude with respect to its parent body, substantially different portions of the parent body and sky are within the field of view of each of the heat sensory means and the voltages produced by the transducer means of each of the sensory means have substantially equal values, circuit means to which the output voltages of the transducer means of each of the heat sensory means are applied for producing error signals which are a function of the deviation of the attitude of the satellite from said predetermined attitude with respect to its parent body.

4. In an attitude control system for a satellite adapted to orbit a parent body, a plurality of heat sensory means, each of said sensory means being comprised of a thermocouple and lens means fixedly mounted on said satellite for focusing all incident thermal radiation within a given field of view passing through said lens means upon the thermocouple, each of said heat sensory means adapted to be fixedly mounted on the satellite in a predetermined relationship so that when the satellite has the desired attitude with respect to its parent body, a part of the parent body and a part of the sky are within the field of view of each of the heat sensory means and the voltages produced by the thermocouples of each of the sensor devices have magnitudes which are a function of the average temperature of earth and sky within the view of each element, circuit means to which the output voltages of the thermocouple of each of the heat sensory means are applied for producing signals which are a function of the deviation of a satellite from said desired attitude with respect to its parent body.

5. A system for maintaining the attitude of a satellite orbiting a parent body so that its jaw axis substantially continuously points toward the center of gravity of the parent body, said system comprising a minimum of three radiant energy sensory elements, each of said elements having transducer means for producing an electrical signal proportional to the amount of heat energy focused upon it, and lens means fixedly mounted on said satellite for focusing all the radiation from within a fixed field of view passing through said lens means onto said transducer means, each of said sensory means being fixedly mounted on the satellite so that their fields of view are substantially equiangularly displaced about the yaw axis of the vehicle and so that when the yaw axis of the satellite substantially passes through the center of gravity of the parent body the ratio of parent body to sky within the view of each of said sensory elements will be approximately equal, torque producing means, and circuit means to which said electrical signals are applied for controlling said torque producing means to maintain the attitude of the yaw axis so that it substantially continuously points toward the center of gravity of said parent body.

6. In an attitude control system for a satellite vehicle adapted to orbit a parent body, the improvement comprising at least three radiant energy sensory elements, each of said elements having transducer means for producing an electrical signal proportional to the amount of heat energy focused upon each transducer means, and lens means fixedly mounted on said satellite vehicle for focusing the radiation from within a fixed field of view onto said transducer means, each of said sensory means adapted to be fixedly mounted on a satellite and arranged substantially uniformly with respect to the yaw axis of the vehicle so that when the yaw axis of the satellite substantially passes through the center of gravity of the parent body the ratio of parent body to sky in the field of view of each of said sensory elements will be approximately equal, torque means, and circuit means, to which the electrical signals are applied, for controlling said torque means to maintain the attitude of the yaw axis of the satellite so that it substantially continuously points toward the center of gravity of said parent body.

7. An attitude control system for a satellite adapted to be orbited about a parent body, said satellite having a yaw axis, a roll axis, a pitch axis, pitch torque producing means and roll torque producing means, comprising a pair of roll radiant energy sensory elements and a pair of pitch radiant energy sensory elements, each of said elements comprising transducer means for producing an electrical signal proportional to the intensity of the radiation focused on said transducer means and lens means fixedly mounted on said satellite for focusing radiation within a fixed field of view onto said transducer means, said roll sensory elements adapted to be fixedly mounted on said vehicle so that when the yaw axis has a predetermined attitude with respect to the parent body the ratio of parent body to sky within the field of view of the roll sensory elements will be substantially equal, and when the yaw axis deviates from its predetermined attitude as measured about its roll axis a greater portion of the parent body will be within the field of view of one of the sensory elements and a lesser portion will be within the field of view of the other, circuit means to which the electrical signals from said roll sensory elements are applied, said circuit means adapted to control the roll torque producing means of the satellite in order to substantially maintain the yaw axis in its predetermined attitude as measured about the roll axis; said pitch sensory elements adapted to be fixedly mounted on said vehicle so that when the yaw axis has its predetermined attitude with respect to the parent body the ratio of parent body to sky within the field of view of the pitch sensory elements will be substantially equal and when the yaw axis deviates from its predetermined attitude as measured about the pitch axis a greater portion of the parent body will be within the field of view of one of the pitch sensory elements and a lesser portion will be within the field of view of the other, circuit means to which the electrical signals from said pitch sensory elements are applied, said circuit means adapted to control the pitch torque producing means of the satellite in order to maintain the yaw axis in its predetermined attitude as measured about the pitch axis.

References Cited in the file of this patent

UNITED STATES PATENTS

| | | |
|---|---|---|
| 2,740,961 | Slater | Apr. 3, 1956 |
| 2,828,930 | Herbold | Apr. 1, 1958 |
| 2,919,350 | Taylor et al. | Dec. 29, 1959 |
| 2,949,536 | Langton | Aug. 16, 1960 |
| 2,999,161 | Lovoff | Sept. 5, 1961 |
| 3,020,407 | Merlen | Feb. 6, 1962 |
| 3,038,077 | Gillespie et al. | June 5, 1962 |
| 3,090,583 | Behun et al. | May 21, 1963 |